(12) United States Patent
Sato et al.

(10) Patent No.: US 6,872,095 B2
(45) Date of Patent: Mar. 29, 2005

(54) CARD SLOT CONNECTOR

(75) Inventors: Takeshi Sato, Tokyo (JP); Kazuyuki Hasumi, Tokyo (JP)

(73) Assignee: Honda Tsushin Kogyo Co., Ltd., Tokyo (JP)

( * ) Notice: Subject to any disclaimer, the term of this patent is extended or adjusted under 35 U.S.C. 154(b) by 13 days.

(21) Appl. No.: 10/436,273

(22) Filed: May 13, 2003

(65) Prior Publication Data
US 2003/0216082 A1 Nov. 20, 2003

(30) Foreign Application Priority Data
May 15, 2002 (JP) ........................................ 2002-139932

(51) Int. Cl.⁷ ............................................. H01R 25/00
(52) U.S. Cl. ........................ 439/630; 439/607; 439/108
(58) Field of Search ................................. 439/607, 630, 439/108, 92, 34

(56) References Cited

U.S. PATENT DOCUMENTS

| | | | | |
|---|---|---|---|---|
| 5,725,394 A | * | 3/1998 | Banakis et al. | 439/607 |
| 5,795,190 A | * | 8/1998 | Ono | 439/607 |
| 5,807,137 A | * | 9/1998 | Janota et al. | 439/607 |
| 5,967,812 A | * | 10/1999 | Tung et al. | 439/159 |
| 6,099,335 A | * | 8/2000 | Chang | 439/188 |
| 6,129,588 A | * | 10/2000 | Chang | 439/630 |
| 6,132,243 A | * | 10/2000 | Hirata et al. | 439/541.5 |
| 6,162,075 A | * | 12/2000 | Hara et al. | 439/159 |
| 6,475,005 B2 | * | 11/2002 | Yu | 439/157 |
| 6,623,304 B2 | * | 9/2003 | Harasawa et al. | 439/630 |
| 6,641,441 B2 | * | 11/2003 | Liu | 439/630 |
| 6,692,271 B2 | * | 2/2004 | Watanabe | 439/108 |
| 2003/0157839 A1 | * | 8/2003 | Yamaguchi et al. | 439/630 |

* cited by examiner

Primary Examiner—Tho D. Ta
Assistant Examiner—Larisa Tsukerman
(74) Attorney, Agent, or Firm—Wenderoth, Lind & Ponack, L.L.P.

(57) ABSTRACT

A card slot connector is to be mounted onto a printed circuit board for making a required electrical connection between a card and a printed circuit. The connector comprises a housing of a synthetic resin material and a metal shell applied to one side of the housing. The other side of the insulating housing is arranged to be fixed to the printed circuit board. When the card slot connector is mounted onto the printed circuit board, a ceiling plate the metal shell is spaced apart from the printed circuit board, thereby permitting the mounting of electronic devices and parts in the area of the printed circuit board occupied by the card slot connector.

2 Claims, 7 Drawing Sheets

Fig. 2(A)
Fig. 2(B)
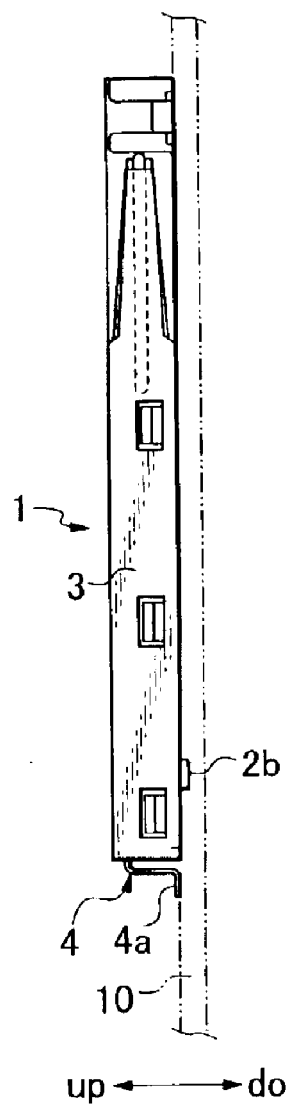
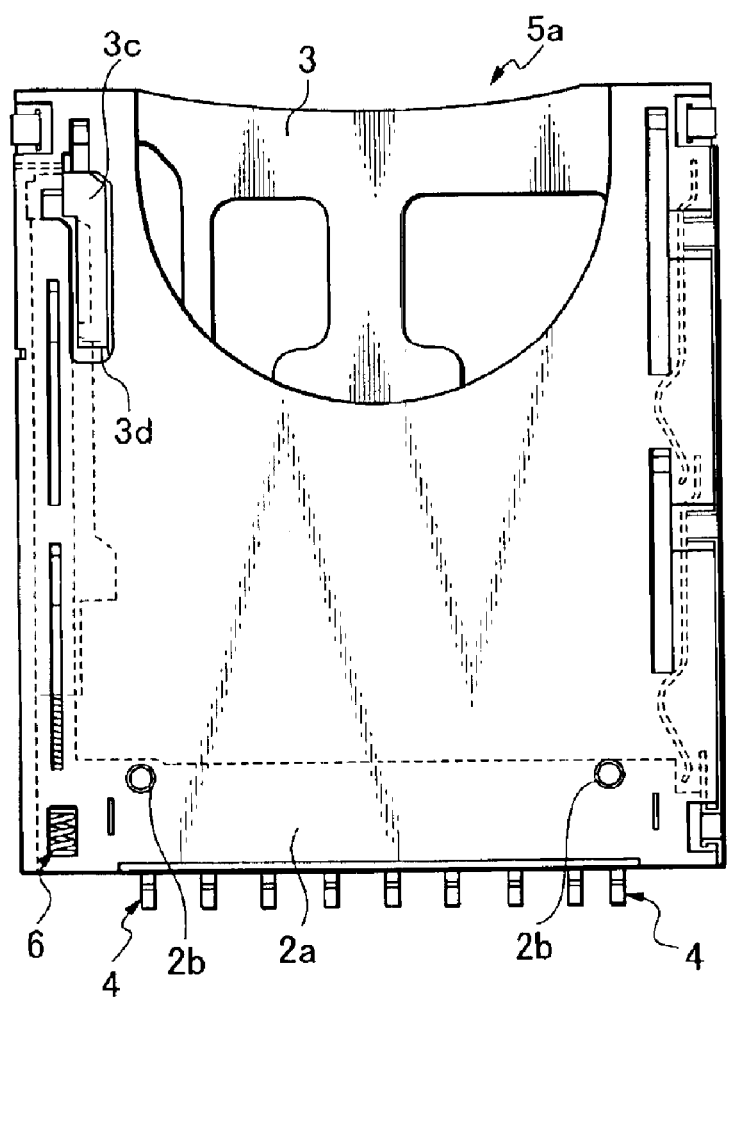
up ← → down

Fig. 4(A)
Fig. 4(B)
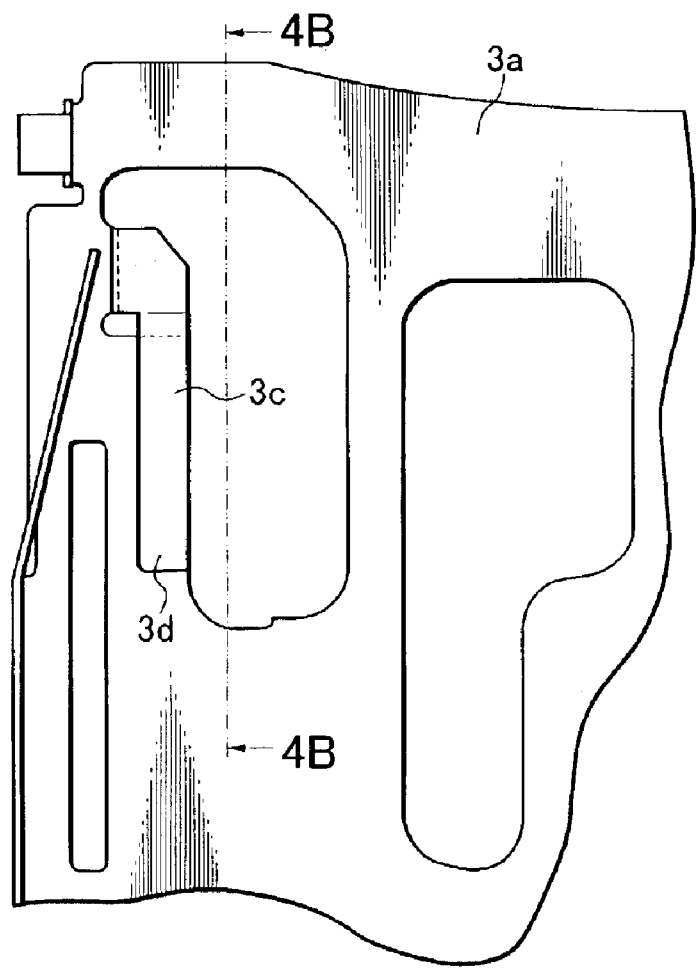
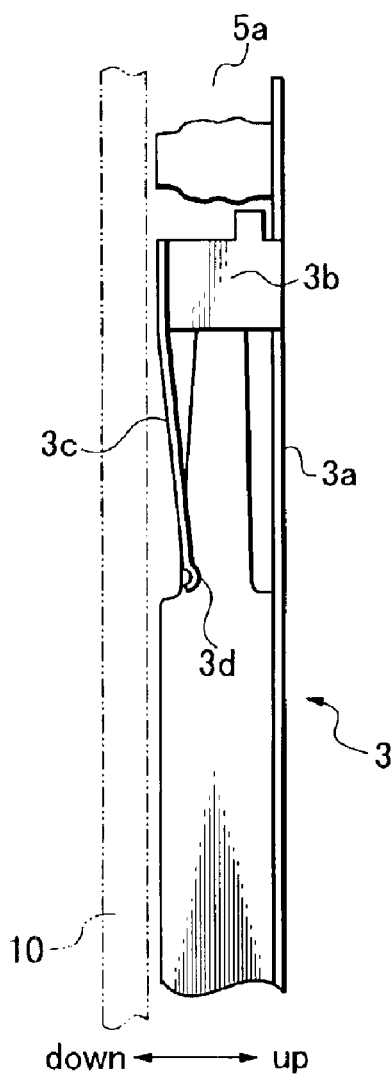
down ← → up front side rear side

CARD SLOT CONNECTOR

BACKGROUND OF THE INVENTION

1. Field of the Invention

The present invention relates to a card slot connector for making a required electrical connection between a secure digital memory card (abbreviated as SD card) and the printed circuit of a circuit board, on which the connector is mounted. Such card slot connectors are used in small-sized electronic devices such as digital cameras, cellular phones, MP3 (MPG Audio layer-3) or PDA (Personal Digital Assistants).

2. Related Art

Referring to FIGS. 7(A)–(D) and 8(A) and (B), a conventional card slot connector 11 is fixed to a printed circuit board 10, permitting an SD memory card 7 (see FIGS. 5(A) and (B)) to be inserted in or removed from its slot 11a for connection to or disconnection from the printed circuit.

The card slot connector 11 comprises: a housing 13 of a synthetic resin material having a plurality of contact pieces 12 embedded therein, and a flat, shielding metal shell 14 applied to one side of the housing 13, and a push—push switch 6 attached to one longitudinal side of the housing 13, extending in the direction in which a card is inserted and removed. The contact pieces 12 are soldered to selected conductors in the printed circuit.

As seen from FIG. 7(B), the card slot connector 11 is fixed to the printed circuit board 10 with its metal shell 14 located on the printed circuit board 10. A grounding contact piece 15 of the metal shell 14 may be kept in contact with a grounding terminal 7b of an SD memory card 7 (see FIG. 5(A)) when the card 7 is inserted in the card slot connector 11, so that the grounding terminal 7b may be connected to the grounding terminal of the printed circuit board 10 via the grounding contact piece 15 of the metal shell 14.

Disadvantageously this arrangement prevents electronic devices and parts from being mounted in the area of the printed circuit board occupied by the card slot connector 11 with the metal shell 14 located on the printed circuit board 10, which metal shell 14 would short-circuit electronic devices and parts if they are put between the metal plate 14 and the circuit board 10. As the parts-loading density per unit area of a printed circuit board increases, a demand is increased for making full use of the surface area of the printed circuit board including that occupied by the card slot connector.

One object of the present invention is to provide a card slot connector to meet such a demand, permitting electronic parts or devices to be mounted on the area occupied by the card slot connector.

SUMMARY OF THE INVENTION

To attain this object according to the present invention, a card slot connector to be mounted onto a printed circuit board for making a required electric connection between a memory card and the printed circuit, comprises: a housing of a synthetic resin material and a metal shell applied to one side of the housing, the housing having means to fix itself to the printed circuit board on the other side, whereby the card slot connector may be mounted onto the printed circuit board with a ceiling plate of the metal shell spaced above the printed circuit board.

The card slot connector can be fastened to the printed circuit board with the ceiling plate of metal shell spaced above the printed circuit board, thus leaving the underlying area of the printed circuit board for mounting electronic parts and devices.

The shell may have a selected part cut and pushed down to provide a grounding contact, which is adapted to be put in contact with the grounding terminal of a memory card when it is inserted in the card space of the connector.

This arrangement assures that the card is grounded when inserted in the card slot connector.

Other objects and advantages of the present invention will be understood from the following description of a card slot connector according to one embodiment of the present invention, which is shown in the accompanying drawings.

BRIEF DESCRIPTION OF THE DRAWINGS

FIGS. 2(A) and 2(B) are side and bottom views of the card slot connector, the bottom view illustrating a non-shielded side of the connector;

FIG. 4(A) is an enlarged view of a fragment of the metal shell whereas FIG. 4(B) is a sectional view of the fragment taken along the line "4(B)"—"4(B)" in FIG. 4(A);

DETAILED DESCRIPTION OF PREFERRED EMBODIMENT

Figure 1A:
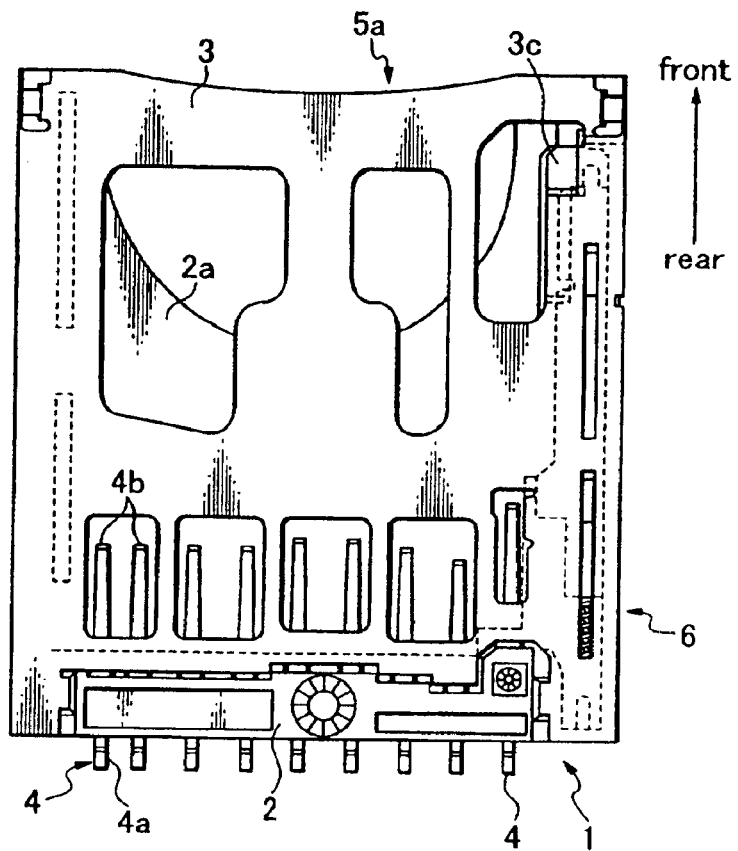
FIGS. 1(A), 1(B) and 1(C) are plan, front and side views of a card slot connector according to the present invention.
Figure 1C:
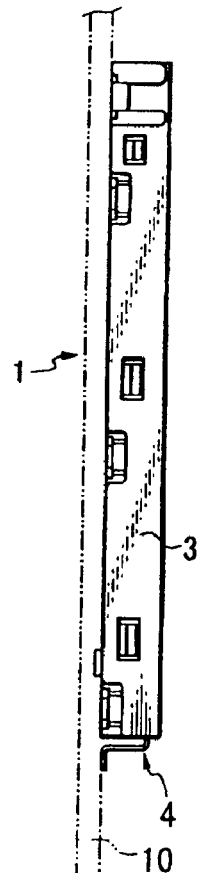

Referring to FIGS. 1(A)–(C) and 2(A) and (B), a card slot connector according to the present invention comprises a housing 2 of a synthetic resin material and a metal shell 3 applied to one side of the housing 2. The housing 2 has a plurality of contact pieces 4 embedded therein. The housing 2 and the metal shell 3 define a card space 5 for accommodating a memory card such as an SD memory card. A push-and-push switch mechanism 6 is fastened to one longitudinal sidewall, partly projecting in the card space 5.

Figure 5A:
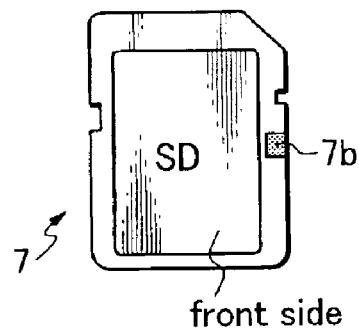
FIGS. 5(A) and 5(B) illustrate the front and rear sides of an SD memory card.
Figure 5B:
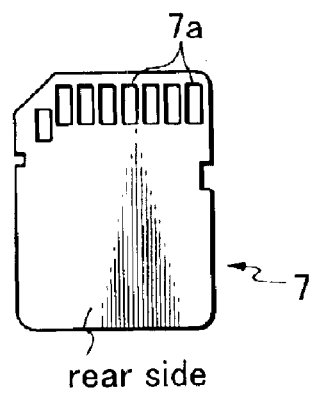

More specifically the housing 2 comprises left and right longitudinal sidewalls, a rear wall and a bottom plate 2a. The bottom plate 2a has two bosses 2b projecting therefrom for placing the connector on a printed circuit board in position. The rear wall has the contact pieces 4 fitted in its through holes. The rear ends 4a of the contact pieces 4 are bent and soldered to selected conductors on a printed circuit board 10, and the front ends 4b of the contact pieces 4 are adapted to be resiliently kept in contact with the contact pads 7a of the SD memory card 7 (see FIGS. 5(A) and (B)) when inserted in the connector 1, thus making a required electrical connection between the SD memory card 7 and the printed circuit 10.

Figure 1B:
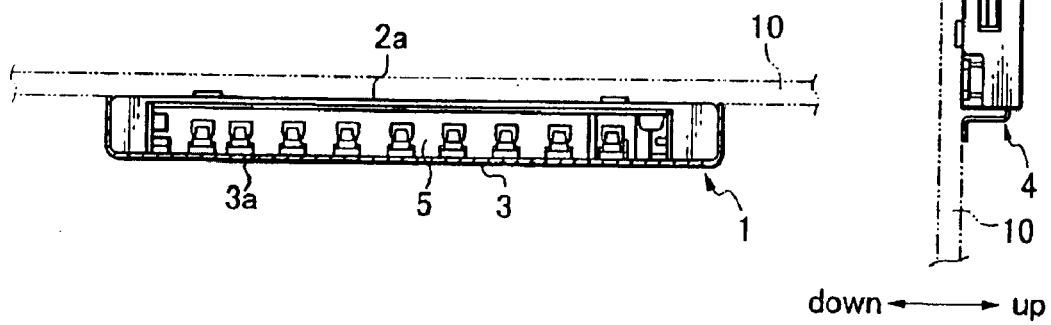

As shown in FIGS. 1(A)–(C) and 2(A) and (B), the metal shell 3 is laid on the bottom plate 2a of the housing 2, so that a ceiling plate 3a of the metal shell 3 may be spaced above the printed circuit board 10; the connector 1 is laid on the printed circuit board 10 with its non-shielded side 2a thereon (see FIG. 1(B)).

The card space 5 is defined by the opposite longitudinal side and rear walls, and the bottom plate 2a of the insulating housing 2 and the overlying metal shell 3, leaving its front side open to insertion and removal of a memory card 7 from the card space 5.

Figure 3:
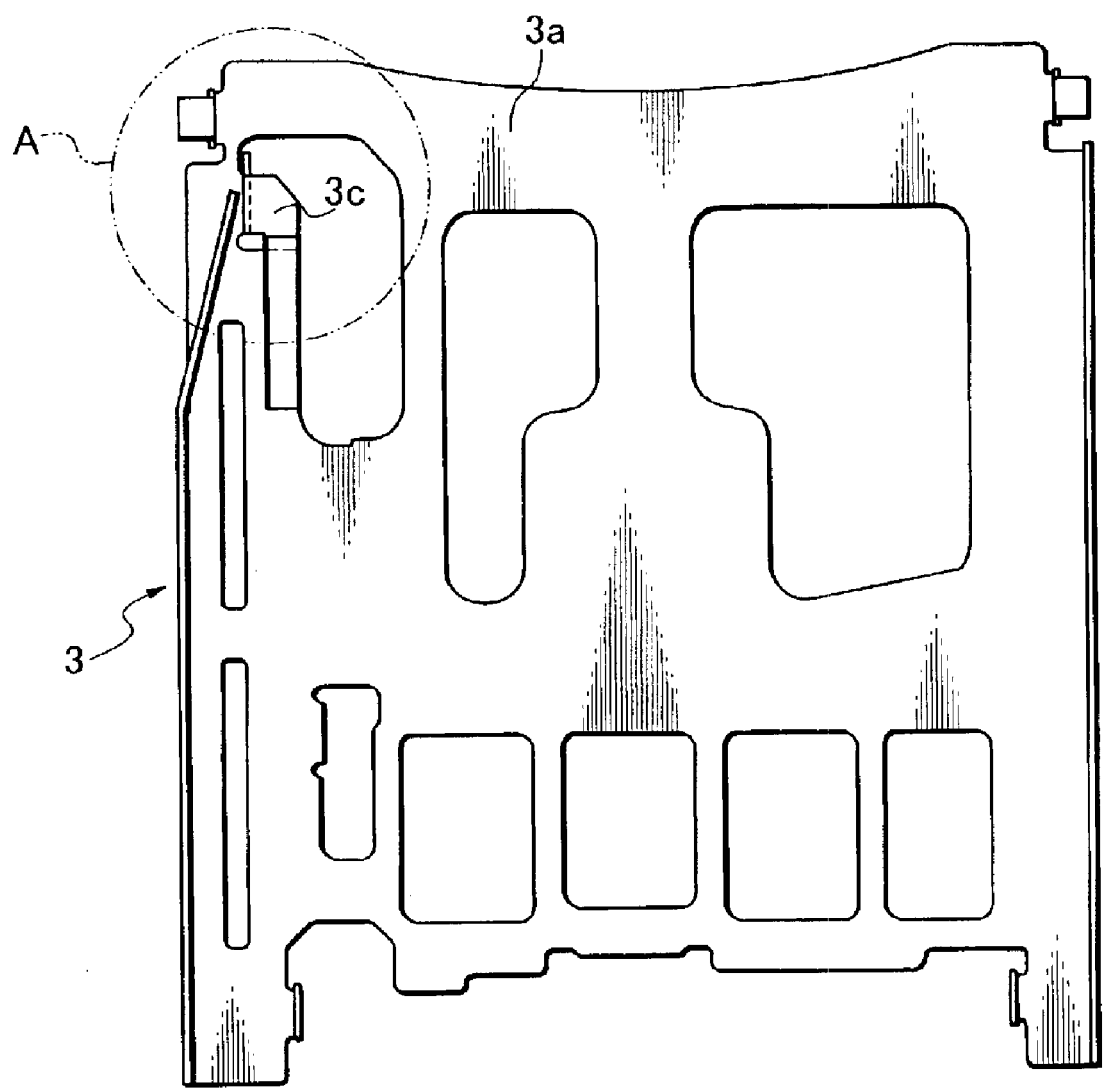
FIG. 3 is a plan view of a metal shell.

Referring to FIGS. 3, 4(A) and 4(B), the metal shell has a selected part cut and pushed down to provide a grounding contact. The grounding contact comprises a descendent section 3b bent at right angles relative to the ceiling plate 3a of the shell 3, and an upward-oblique contact section 3c integrally connected to the vertical descendent section 3b, somewhat rising toward the ceiling plate 3a.

Figure 6:
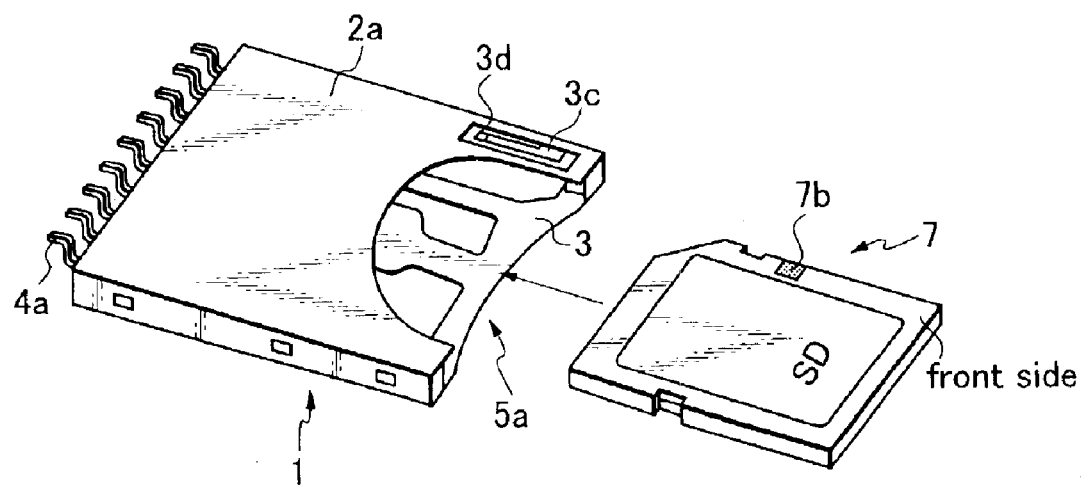
FIG. 6 illustrates how a card can be inserted in the card slot connector.
Figure 7A:
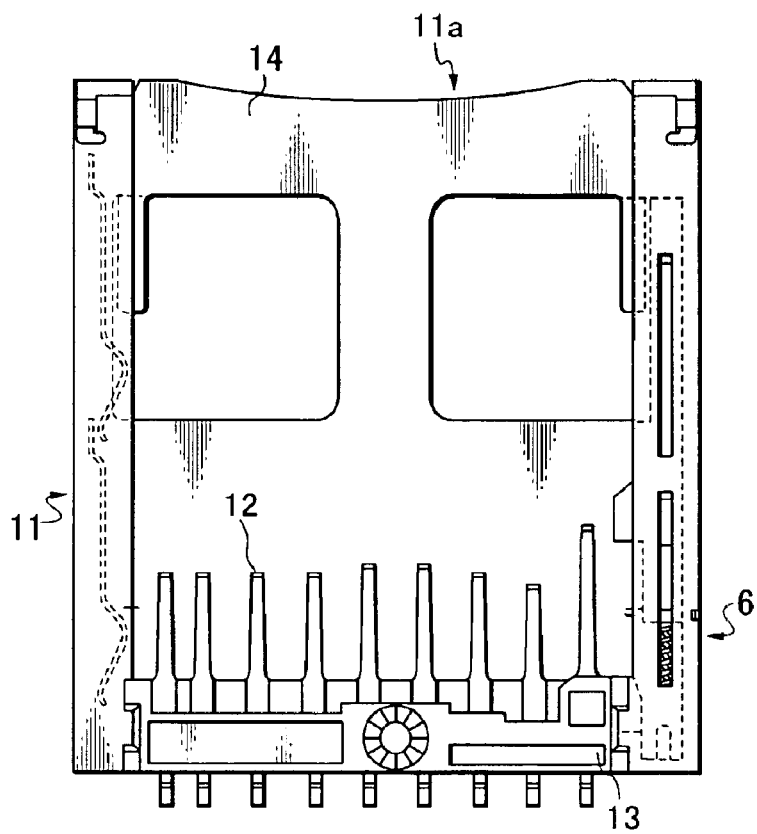
FIGS. 7(A), 7(B), 7(C) and 7(D) are plan, front, side and rear views of a conventional card slot connector.
Figure 7C:
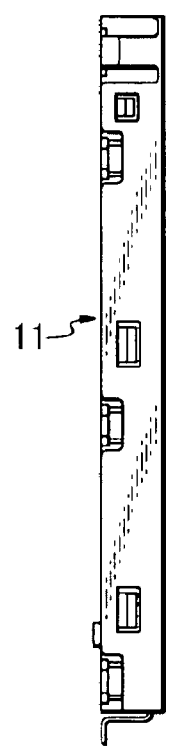
Figure 7B:
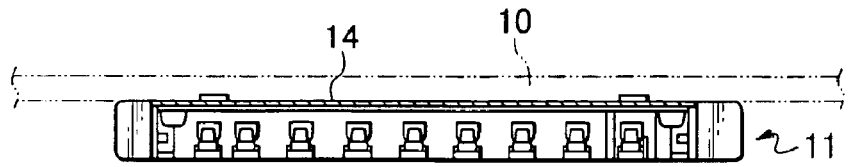
Figure 7D:
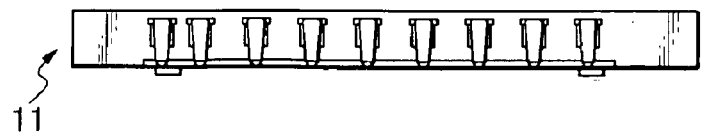
Figures 8A, 8B:
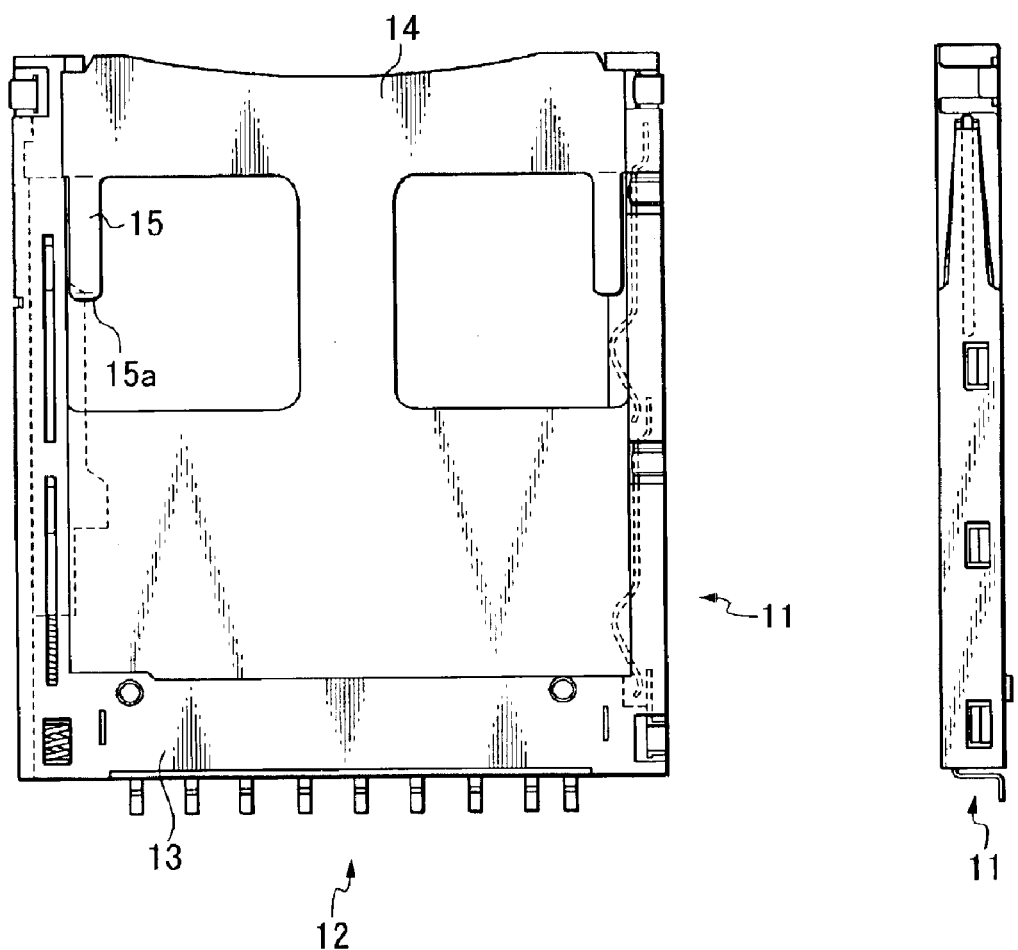
FIG. 8(A) is another plan view of the conventional card slot connector illustrating a shielded side of the connector.
FIG. 8(B) is another side view of the connector.

Thus, as shown in FIG. 6, the contact end 3d of the oblique contact section 3c is allowed to rub the grounding terminal 7b of the SD memory card 7 when it is inserted in the card space 5 of the connector 1 via the card slot 5a.

As may be understood from the above, when the card slot connector is fixed to a printed circuit board 10 by soldering its contact pieces 4 to selected conductors in the printed circuit board 10, the ceiling plate 3a of the metal shell 3 is above the printed circuit board 10.

The insulating bottom 2a of the housing 2 faces the printed circuit board 10, so that electronic parts and/or devices may be put on the area confronting the insulating bottom 2a. Accordingly the effective space available for mounting electronic parts and/or devices is enlarged on the printed circuit board 10.

Thus, according to the present invention, the grounding terminal 7b is connected to the grounding circuit of the printed circuit board 10 via the metal shell 3. This arrangement reduces the number of parts necessary to attain the grounding and shielding of the SD memory card 7.

What is claimed is:

1. A card slot connector to be mounted onto a printed circuit board for making a required electrical connection between a memory card and a printed circuit of the printed circuit board, said card slot connector comprising:

a housing formed of a synthetic resin material and including a bottom plate and side walls projecting from said bottom plate, said bottom plate being arranged to be fixed to the printed circuit board such that the bottom plate faces the printed circuit board; and a metal shell mounted to said side walls of said housing and including a ceiling plate arranged to define, together with said bottom plate and said side walls of said housing, a card space for receiving the memory card, said card space having an open front end constituting a card-insertion slot through which the memory card can be inserted into said card space toward a rear end of said card space, said ceiling plate of said metal shell being mounted to said side walls of said housing so as to be spaced apart from the printed circuit board when said card slot connector is mounted on the printed circuit board;

wherein said metal shell further includes a grounding contact constituted by a cut-out section of said ceiling plate of said metal shell, said grounding contact including a descendant section extending downwardly from said ceiling plate toward said bottom plate and an upward-oblique contact section extending generally laterally from a lower end of said descendant section so as to extend toward the rear end of said card space while sloping gradually upward toward said ceiling plate, said grounding contact being arranged to be contacted with a grounding terminal of the memory card when the memory card is inserted into said card space via said card-insertion slot.

2. A card slot connector according to claim 1, further comprising a plurality of contact pieces embedded in a rear end portion of said housing so that first ends of said contact pieces project into a rear end of said card space for contact with contact members of the memory card when the memory card is inserted in said card space, said contact pieces having second ends projecting externally of said card slot and adapted for connection to conductors of the printed circuit of the printed circuit board.

* * * * *